US009043704B2

(12) United States Patent
Allot

(10) Patent No.: US 9,043,704 B2
(45) Date of Patent: May 26, 2015

(54) METHOD FOR CONFIGURING DISPLETS FOR AN INTERACTIVE PLATFORM FOR ANALYZING A COMPUTER NETWORK PERFORMANCE

(75) Inventor: Jean-François Allot, Etampes (FR)

(73) Assignee: Infovista SA, Les Ulis (FR)

( * ) Notice: Subject to any disclaimer, the term of this patent is extended or adjusted under 35 U.S.C. 154(b) by 31 days.

(21) Appl. No.: 12/295,082

(22) PCT Filed: Mar. 23, 2007

(86) PCT No.: PCT/FR2007/000492
§ 371 (c)(1),
(2), (4) Date: Sep. 29, 2008

(87) PCT Pub. No.: WO2007/118956
PCT Pub. Date: Oct. 25, 2007

(65) Prior Publication Data
US 2009/0307596 A1 Dec. 10, 2009

(30) Foreign Application Priority Data
Mar. 31, 2006 (FR) ..................................... 06 02848

(51) Int. Cl.
*G06F 3/048* (2013.01)
*H04L 12/24* (2006.01)
*G06F 3/0481* (2013.01)
*H04L 29/06* (2006.01)

(52) U.S. Cl.
CPC ........ *H04L 41/5067* (2013.01); *G06F 3/04812* (2013.01); *H04L 41/22* (2013.01); *H04L 41/5009* (2013.01); *H04L 63/102* (2013.01)

(58) Field of Classification Search
CPC .......................... G06F 3/04812; G06F 3/0482

USPC ......... 715/734–739, 770–772, 748–749, 802, 715/804, 741–743
See application file for complete search history.

(56) References Cited

U.S. PATENT DOCUMENTS

| | | | |
|---|---|---|---|
| 6,076,166 A | 6/2000 | Moshfeghi et al. | |
| 6,449,643 B1 | 9/2002 | Hyndman et al. | |
| 7,222,078 B2 * | 5/2007 | Abelow | 705/1.1 |
| 7,318,066 B2 * | 1/2008 | Kaufman et al. | 1/1 |
| 7,376,898 B1 * | 5/2008 | Yehuda et al. | 715/741 |
| 7,519,702 B1 * | 4/2009 | Allan | 709/224 |
| 7,730,134 B2 * | 6/2010 | Blagsvedt et al. | 709/204 |
| 7,739,605 B2 * | 6/2010 | Plotkin et al. | 715/736 |
| 7,840,902 B2 * | 11/2010 | Graves et al. | 715/741 |

(Continued)

OTHER PUBLICATIONS

Park et al. "Role-Based Access Control on the Web", ACM Transactions on Information and System Security, vol. 4, No. 1, Feb. 2001, pp. 37-71.

(Continued)

*Primary Examiner* — Steven Sax
(74) *Attorney, Agent, or Firm* — Greer, Burns & Crain, Ltd.

(57) ABSTRACT

A method for configuring an interactive platform for monitoring the performance and the quality of a computer network, the monitoring data being suitable to be displayed on a dynamic page of type webpage in a form of graphic components called "displets"; including providing, on the interactive platform a configuration interface in which are defined, for at least one given user, filtering criteria for displaying displets, the criteria being defined in the form of parameters for configuring the rights of the at least one user.

11 Claims, 2 Drawing Sheets

(56) References Cited

U.S. PATENT DOCUMENTS

| | | | |
|---|---|---|---|
| 7,841,011 B2* | 11/2010 | Manson et al. | 726/28 |
| 8,271,588 B1* | 9/2012 | Bruno et al. | 709/206 |
| 2002/0186238 A1* | 12/2002 | Sylor et al. | 345/736 |
| 2003/0046390 A1* | 3/2003 | Ball et al. | 709/224 |
| 2003/0184580 A1* | 10/2003 | Kodosky et al. | 345/734 |
| 2004/0046785 A1* | 3/2004 | Keller | 345/734 |
| 2004/0172397 A1* | 9/2004 | Asherman | 707/9 |
| 2005/0168891 A1* | 8/2005 | Nilman-Johansson et al. | 361/23 |
| 2005/0209874 A1* | 9/2005 | Rossini | 705/1 |
| 2007/0011146 A1* | 1/2007 | Holbrook | 707/3 |
| 2007/0233530 A1* | 10/2007 | Blaszka et al. | 705/6 |
| 2010/0229096 A1* | 9/2010 | Maiocco et al. | 715/734 |

OTHER PUBLICATIONS

McPherson, Role-Based Access Control for Multi-tier Applications Using Authorization Manager, URL:http://technet2.microsoft.com/WindowsS063276cd0b61033.mspx?pf=true, Feb. 5, 2007.

* cited by examiner

METHOD FOR CONFIGURING DISPLETS FOR AN INTERACTIVE PLATFORM FOR ANALYZING A COMPUTER NETWORK PERFORMANCE

The present invention relates to a method for configuring an interactive platform for monitoring the performance and quality of a computer network. This platform allows a set of monitoring data to be communicated to users. These data are displayed on a dynamic page of web page type in the form of graphic components termed "displets". The computer platform can be considered as a web portal.

Generally, this computer platform is a service level management (SLM) tool, the role of which is to supervise a computer network and an information system. The computer platform measures the quality level of the information system and the elements of the computer network to which it is connected by detecting and diagnosing the problems. It then generates alerts by e-mail or in the form of activity reports. These reports can be presented to users in the form of graphic components or "displets". In fact, the computer platform comprises a database server which is accessible by communication of the client-server type. The network elements can comprise machines and/or applications.

More specifically, a portal comprising a set of pages containing the displets is designed for a user or a group of users. The displet can be presented in the form of a graphic window displaying the items of information such as reports, navigation icons ("navigation widgets"), graphs, etc. The displets can interact, enabling interactive applications to be realized in web pages, in order to browse from general views towards more specific data.

A computer platform of the prior art offers criteria mechanisms in which the data presented as a function of the end user (internal maintenance operations, business or external client management) are filtered: these filters act like "masks" applied when a data retrieval request is sent from the database. For example, a criterion relating to a property is often defined such that the client "ACME" sees only the data which concern him or her.

The role of the filtering criteria is therefore to render certain data, i.e. certain displets, accessible to predetermined users.

However, the mechanisms of the prior art, consisting of directly configuring each displet so as to define the filtering criteria which are applicable to them, comprise significant limitations.

The first limitation is the lack of security. The criteria mechanisms of the prior art are mainly used during the design of the initial views. During navigation in the display window, by synchronization and zoom ("drilldown") displets, new filtering criteria are defined and used in URLs which are submitted via a web browser to the server of the interactive platform in order to obtain the desired view. Such a URL can be easily retrieved by an end user. Then, by manually modifying the filter parameters in the URL, this user can obtain access to the data for other machines or elements of the system, thus bypassing the existing criteria mechanisms.

The second limitation is the lack of factorization. The filtering criteria must be defined for each displet of the portal. This limitation increases the time required to design the pages of the portal and often leads to errors, in particular if the designer forgets to define the appropriate filtering criteria on all the displets.

A purpose of the present invention is a novel configuration method which is simple to implement and to use and has an increased level of security.

At least one of the purposes is achieved by a method for configuring an interactive platform monitoring the performance and the quality of a computer network. This platform comprises a client-server database. The platform can display the monitoring data in the form of graphic components termed "displets" on a dynamic page of web page type. According to the invention, the interactive platform comprises a configuration interface in which are defined, for at least one given user, filtering criteria for displaying displets, said criteria being defined in the form of parameters for configuring the rights of said at least one user.

According to an advantageous characteristic of the invention, said criteria are systematically activated by the interactive platform in order to ensure secured access to the data.

With the method according to the invention, the filtering criteria are not defined at the level of each displet as in the prior art, but directly at the level of the users' parameters. The users, and not directly the displets, are parameterized. Such filtering criteria are called shared criteria. This provides numerous advantages including guaranteed security. In fact:
the shared criteria are applied each time the data have to be collected from the database;
the definitions of the shared criteria are never presented to the end user, even in the URLs exchanged via a web browser. If a user tries to change the parameters of URLs transmitted to the server, the systematic use of the shared criteria on the server side prevents unauthorized access to the data.

Advantageously, the shared criteria can be applied either to the set of displets for different pages or to a given group of displets. In other words, the user parameters are defined, but these parameters concern a group or all the displets.

Moreover, the present invention is in particular remarkable for the fact that the shared criteria can be applied to a group of users or to each user of the group by inheritance.

According to the invention, each group can be organized according to a multi-level directory structure. The specific criteria for a given level of the tree structure can then be defined. These specific criteria can be combined with the criteria defined at the group level and received by inheritance, or these specific criteria can replace, for said given level, the criteria defined at the group level.

With the present invention, the design work for restricting the data presented to the end user is greatly simplified by factorizing the definitions of the shared criteria at the user/group levels. When a pre-designed portal definition is deployed in a client environment, filtering criteria can be applied to the higher levels of the group hierarchy enabling the data presented to be refined without changing the initial design of the portal (and thus ensuring new designs are updated smoothly).

The ability to replace the shared criteria at the displet level allows specific cases to be implemented where common filtering criteria cannot be employed.

According to the invention, the rights of a given user are restricted to the definition and visibility of criteria. This thus allows an end user access to the configuration of a displet, while guaranteeing, by means of the shared criteria, that he or she can only access authorized data.

By limiting the rights on the definition and the visibility of the criteria, new personalization possibilities can be offered to the user, with the guarantee that only the permitted data will always be visible.

Other advantages and characteristics of the invention will become apparent upon examination of the detailed description of an embodiment which is in no way limitative, and the attached drawings, in which.

Figure 1:
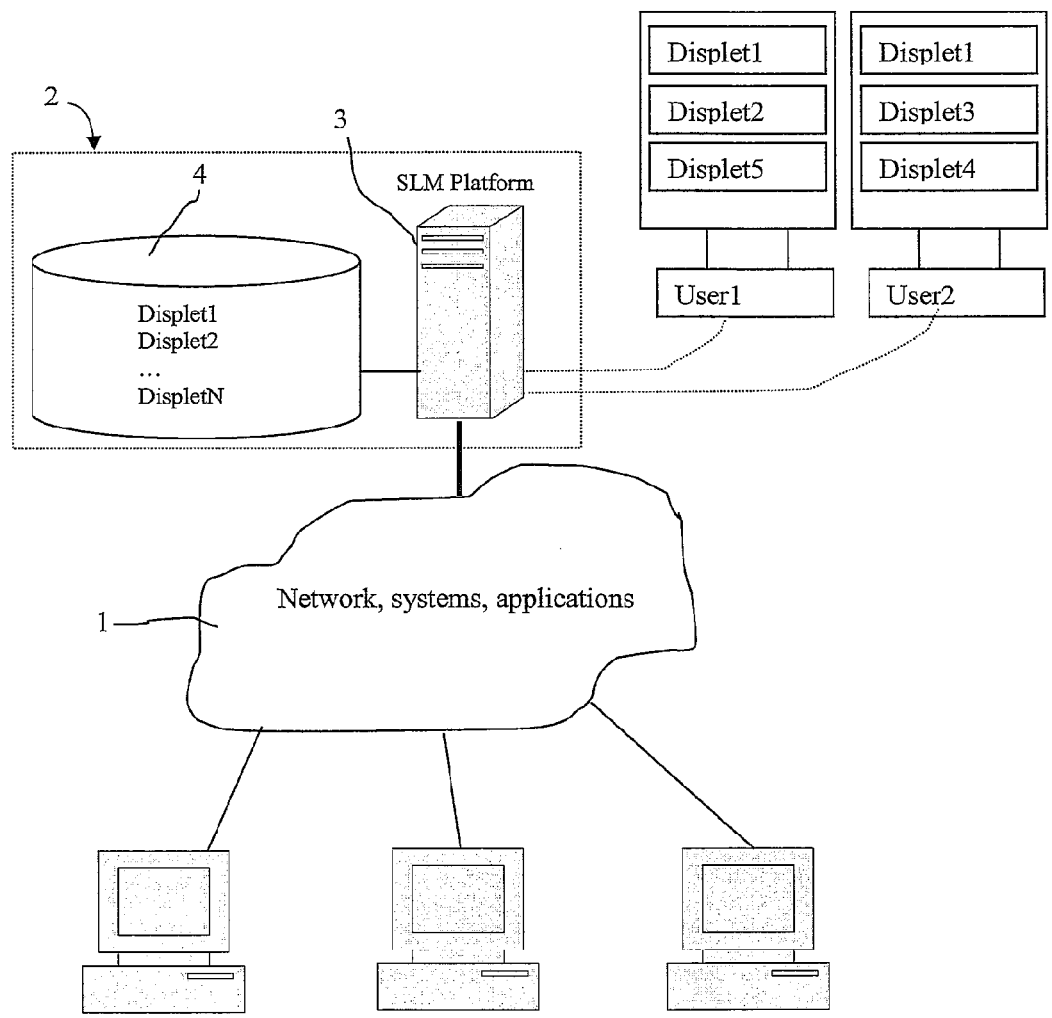
FIG. 1 is a schematic view of the implementation environment of the method according to the invention.
Figure 2:
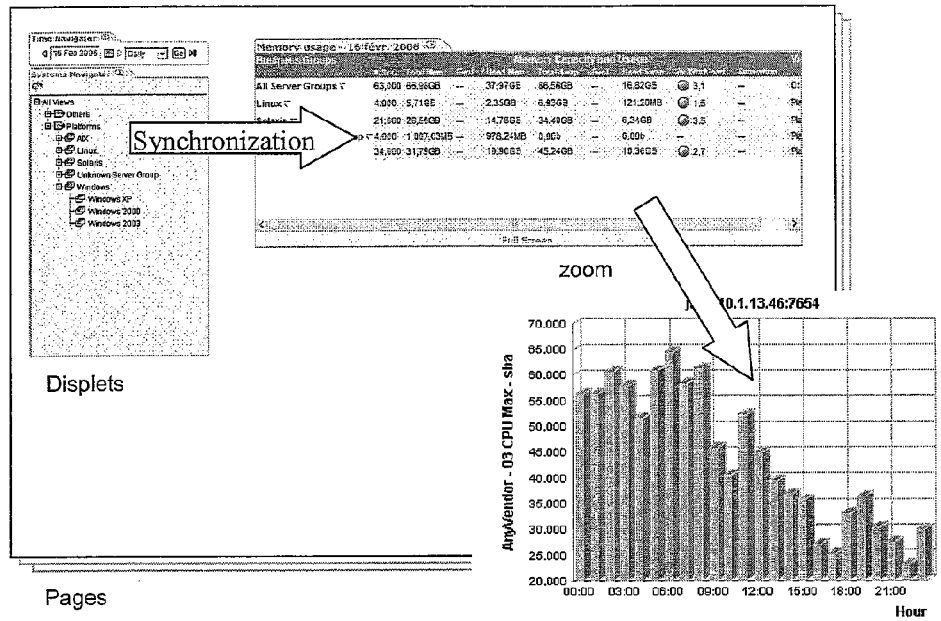
FIG. 2 is a schematic view of a web page displaying three displets in the form of graphic components.

A computer network 1 of a business is seen in FIG. 1. This network 1 comprises several active machines, systems and applications. These elements are being monitored by a service level management (SLM) platform 2 which permanently polls the network 1. This platform comprises a server 3 connected to a database 4. The monitoring data are stored in the database 4 in the form of displets or components each containing a type of data. These different data allow the network 1 to be qualitatively analyzed. The end users user1 and user2 can access the server 3 via a web browser. Each user is only authorized to view a certain number of displets. User1 can for example see displet1, displet2 and displet5. Meanwhile, user2 can see displet1, displet3 and displet4 on a web page. Such a web page is illustrated schematically in FIG. 2. Displet1 is a graphic component in the form of a folder display window. Displet2 is a window displaying the use and the memory capacities of different machines of the network 1. Passing from displet1 to displet2 is by synchronization. Displet5 is a window displaying the detail of one of the machines displayed on displet2. This detail consists of a graphic curve in the form of bars representing the CPU load as a function of time of the machine concerned.

Figure 3:
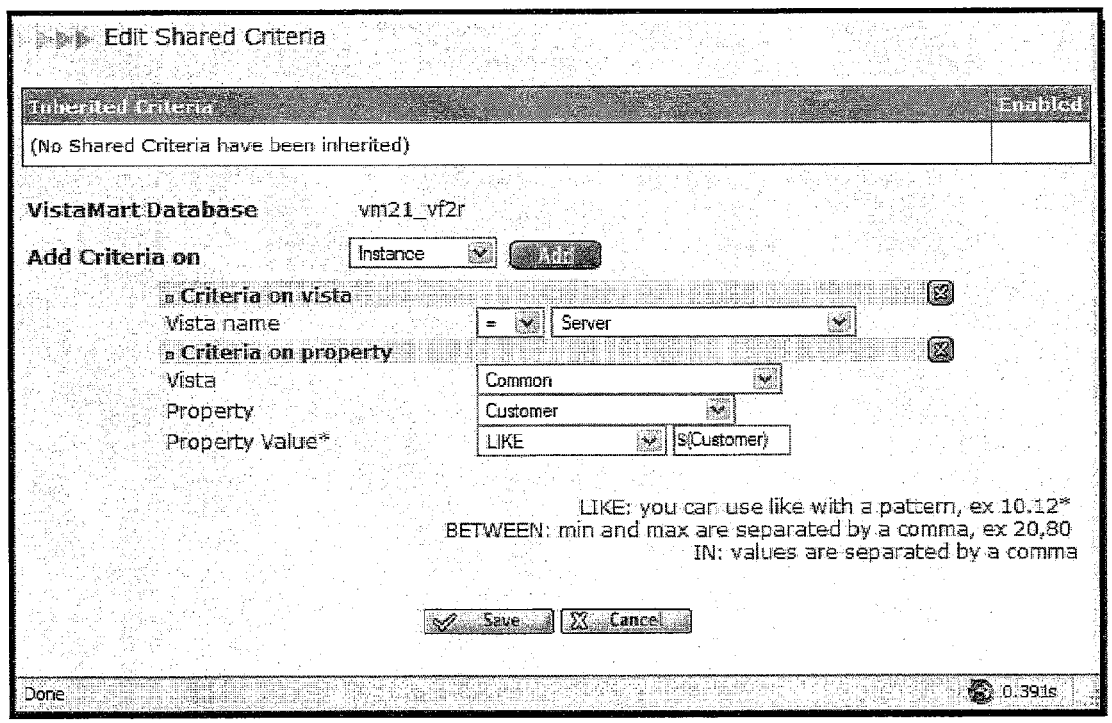
FIG. 3 is a schematic view of a configuration window of the users' parameters.

In order that user1 may not access unauthorized displets, his or her access rights are defined in server 3 by an administrator via a configuration window such as is seen in FIG. 3. This configuration window allows the shared criteria to be configured according to the invention for groups and users. For configuration, the user variables can be employed as shared criteria parameters, further improving their ability to be reused (the user variables can be provided by scripts). These parameters or definitions are saved in the platform database and can be deployed to other portals by using conventional import/export mechanisms. For implementation, the routines load the shared criteria of each user, of his or her group, of the parent group, etc.

When the system is to be implemented in a platform already managing displet criteria according to the prior art, the complete user/group inheritance hierarchy can be reviewed in order to establish an exhaustive list of shared criteria which can be combined with the existing displet criteria. This list is then applied to the SQL requests transmitted to the database such that only the appropriate data is returned to the interactive platform.

The present invention therefore defines a shared-criteria mechanism providing numerous advantages:
- a set of filtering criteria can be defined once for an entire user portal and then used by all the displets of the different pages of this portal;
- the criteria are used systematically by the components on the server side upon each request to the database, in order to ensure secured access to the data;
- these shared criteria can also be defined at the group level and thus transmitted by inheritance to users belonging to the group's tree structure;
- at each level of the inheritance hierarchy: <parent groups> <user> <displet>, the filtering criteria can also be:
  refined by adding new filtering criteria (combined by an "AND" with those inherited);
  replaced by defining new specific filtering criteria.

Of course, the invention is not limited to the examples which have just been described and numerous adjustments can be made to these examples without exceeding the scope of the invention.

The invention claimed is:

1. A method for configuring an interactive platform for monitoring the performance and the quality of a computer network, the monitoring data being suitable to be displayed on a dynamic page of type webpage in a form of graphic components called data display elements, comprising:
   providing on the interactive platform, a configuration interface in which are defined, for two or more given users;
   providing first filtering criteria for displaying the data display elements, said first criteria being defined in the form of parameters for configuring the rights of said two or more users;
   saving said parameters in a platform database;
   using a user configuration interface, providing second filtering criteria as alphanumeric information to be included in a uniform resource locator (URL) submitted via a web browser on the data display elements;
   combining said first filtering criteria and said second filtering criteria defined in the URL to affect authorization of said users;
   establishing an exhaustive list of shared criteria at a level of said parameters of said users, said shared criteria being combinable with existing filtering criteria based on a review of an inheritance hierarchy between said users;
   systematically using said combined criteria, by said components on a server side, for each request to the database; and
   displaying the data display elements based on said combined filtering criteria to said users.

2. The method according to claim 1, characterized in that said combined criteria are systematically activated by the interactive platform in order to ensure secure access to data.

3. The method according to claim 1, characterized in that said combined criteria are applied to a given group of data display elements.

4. The method according to claim 1, characterized in that said combined criteria are applied to the set of data display elements for different pages.

5. The method according to claim 1, characterized in that said combined criteria are applied to a group of users.

6. The method according to claim 5, characterized in that said combined criteria are applied to each user of the group by inheritance.

7. The method according to claim 5, characterized in that each group is organized according to a multi-level tree structure, and in that specific combined criteria are defined for a given tree structure level.

8. The method according to claim 7, characterized in that said specific combined criteria are combined further with the criteria defined at the group level.

9. The method according to claim 7, characterized in that said specific combined criteria replace, for said given level, the criteria defined at the group level.

10. The method according to claim 1, characterized in that the rights of a given user are restricted to the definition and the visibility of said combined criteria.

11. The method according to claim 1, wherein said combined criteria for displaying the data display elements are hierarchically defined.

* * * * *